Aug. 21, 1956    J. J. WILENTCHIK    2,760,146
VARI-FUNCTION POTENTIOMETER
Filed Sept. 24, 1951    2 Sheets-Sheet 1
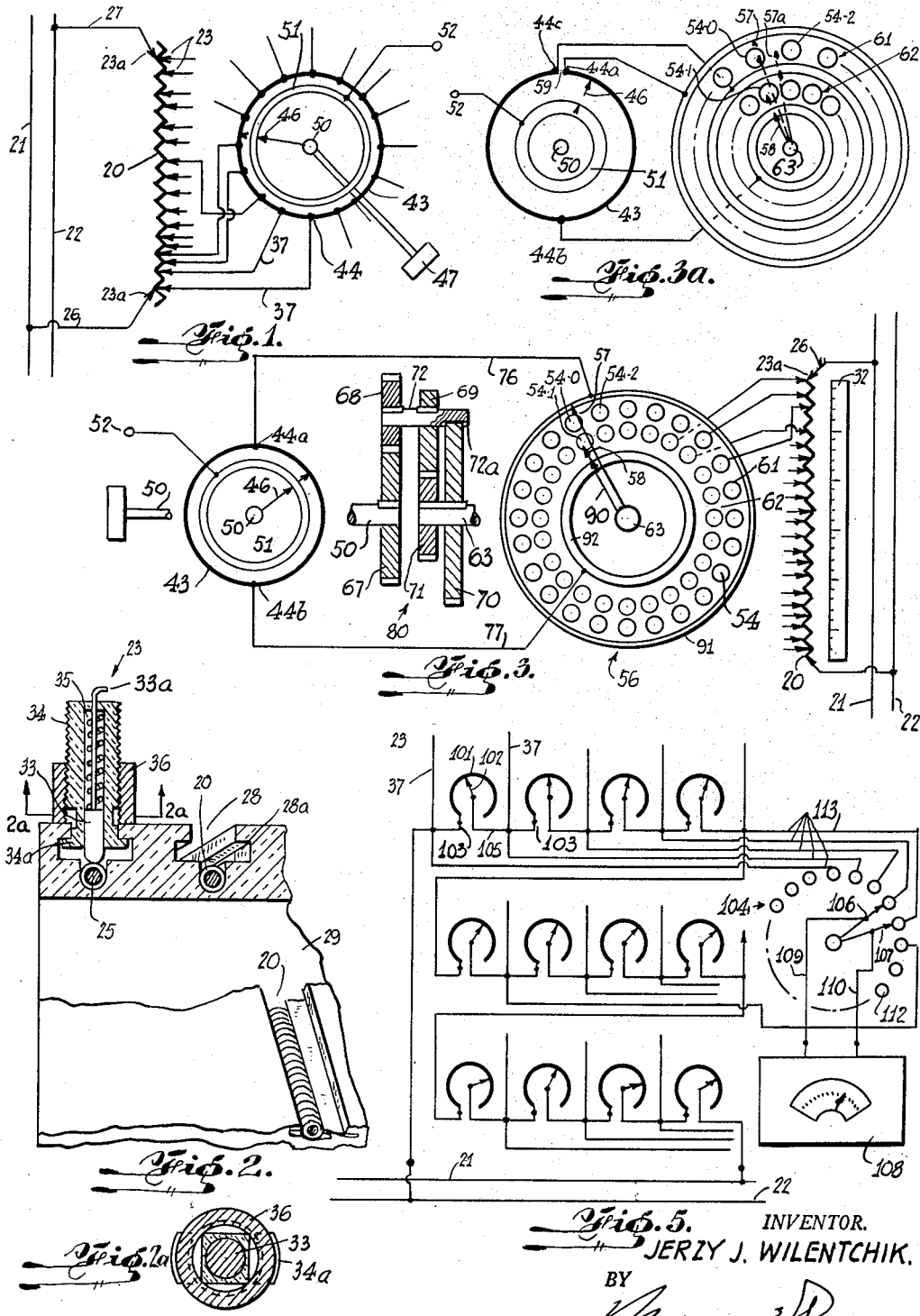
INVENTOR.
JERZY J. WILENTCHIK.
BY
ATTORNEY.

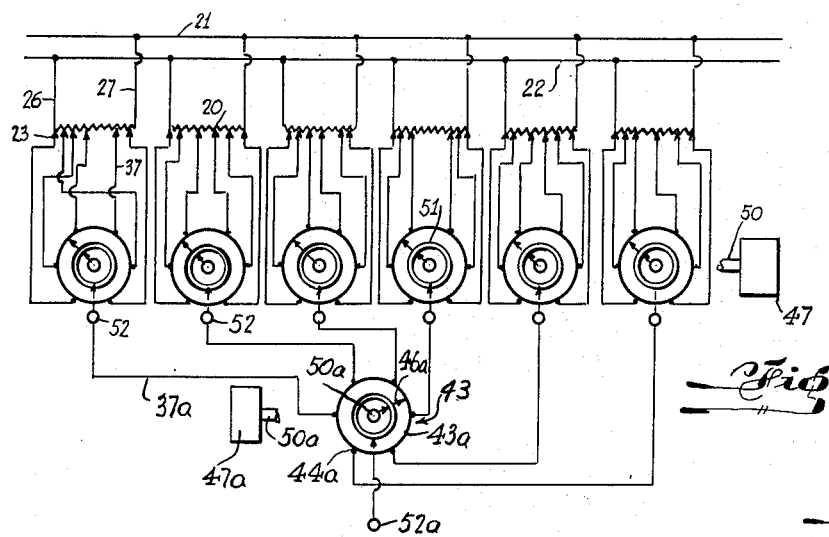
Fig. 7.
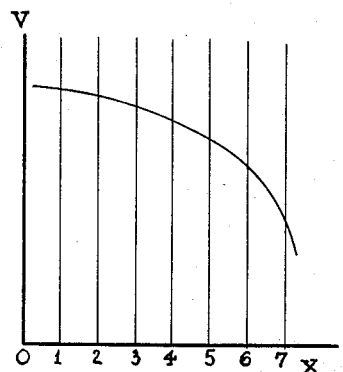
Fig. 4.
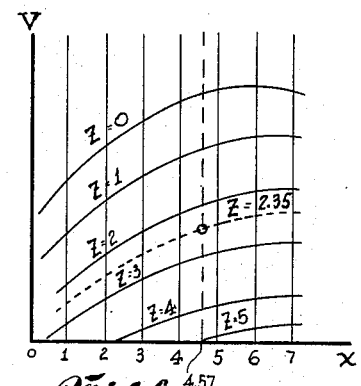
Fig. 6.
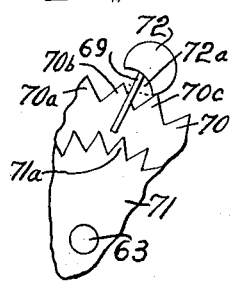
Fig. 3c.
Fig. 3b.
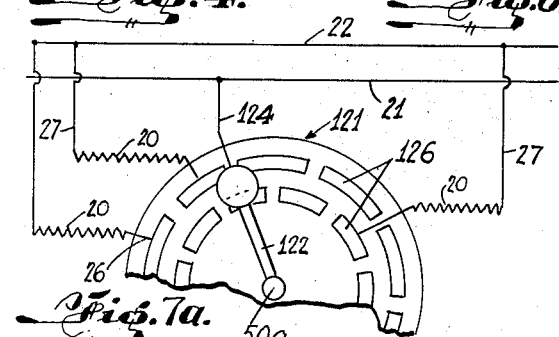
Fig. 7a.
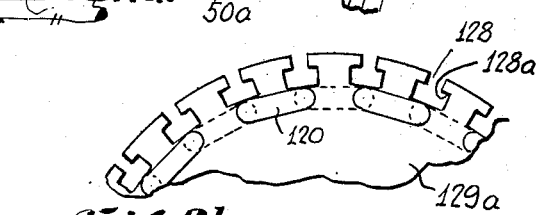
Fig. 2b.
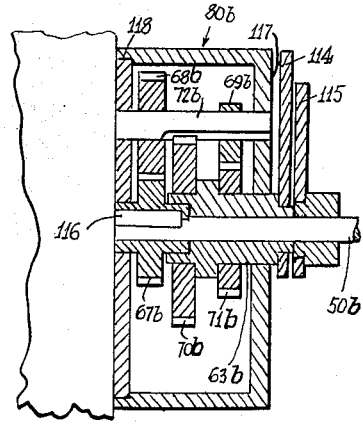
INVENTOR.
JERZY J. WILENTCHIK.
BY
ATTORNEY.

2,760,146
Patented Aug. 21, 1956

2,760,146
VARI-FUNCTION POTENTIOMETER
Jerzy J. Wilentchik, Brooklyn, N. Y.

Application September 24, 1951, Serial No. 248,063

11 Claims. (Cl. 323—67)

This invention relates to improvements in voltage generating systems, wherein it is desired to produce an output voltage "$v$" as a desired function $v=f(x)$ of angular displacement "$x$" of a single control member or as a function $v=f(x, z)$ of respective displacements "$x$" and "$z$" of a pair of independent control members.

An object of the invention is to provide a system of the aforementioned character in which the desired voltage function can be set with extreme precision from data presenting the function in a tabular form, by shifting taps along a calibrated scale or by measuring the amount of resistance between successive taps.

In general, any functional voltage-rotation relationship $v=f(x)$ can be simulated accurately by a sufficiently large number of potentials (referred to as "setting potentials") on the curve of the function and by linear interpolating means between respective setting potentials.

The one variable instrument consists basically of a voltage divider resistance connected across a source of voltage and operating in conjunction with an interpolating potentiometer. Connections in parallel are made between preselected sectors on the potentiometer and the divider. Two embodiments of the basic idea are presented: In the first one those connections are permanent, in the second one they are intermittent through use of a rotary selector and of an intermittent-locking coupling. The sectors are preselected manually by means of readily attachable taps or by individually adjustable rheostats to conform to a desired voltage function.

In the drawings:

Fig. 1 is a schematic representation of a one variable instrument according to the invention.

Fig. 2 is a partly broken, sectional and partly perspective view of the voltage divider mandrel and of the attachable tap.

Fig. 2a is a cross-sectional view of the attachable tap taken along the lines A—A of Fig. 2.

Fig. 2b is a partly broken view of a modified voltage divider mandrel according to the invention.

Fig. 3 is a schematic representation of an embodiment of the one variable instrument according to the invention.

Fig. 3a is a schematic of a modification in the interpolating potentiometer and in the rotary selector according to Fig. 3.

Fig. 3b is a schematic of a vernier dial incorporating an intermittent-locking coupling according to the invention.

Fig. 3c is a sectional side view of the intermittent, locking arrangement according to Fig. 3b.

Fig. 4 is a representation of a single variable function $v=f(x)$ in a $v$—$x$ plane.

Fig. 5 is a schematic representation of an adjustable voltage divider according to the invention.

Fig. 6 is a representation of a two variable function $v=f(x, z)$ in a $v$—$x$ plane.

Fig. 7 is a schematic representation of a two variable instrument according to the invention.

Fig. 7a is a schematic of a rotary selector which can be employed in conjunction with the arrangement in Fig. 7.

Referring first to Figs. 1 and 2 there is shown a voltage divider 20 being connected to voltage supply mains 21 and 22 via a pair of attachable taps 23a and respective conductors 26 and 27. The divider 20 comprises a resistance wire helically wound on a circular, heavily insulated copper core 25, the latter fastened in a spiral, undercut groove 28 in a phenolic cylinder 29, the undercut being indicated at 28a. For applications in which a relatively low input impedance of the potentiometer is required, straight slide wire without the copper core 25 may be employed. Moulded carbon resistance strips could be employed similarly.

A plurality of taps 23 substantially similar to the taps 23a can be attached manually along the length of the groove 28 making electrical connection with the winding 20. The desired location of the taps 23 can be determined by measurement of amount of resistance between successive taps.

The attachable tap 23 seen in Figs. 2 and 2a consists of a spring loaded plunger 33 adapted to slide within an externally threaded shell 34 against the pressure of a spring 35, and of a locking nut 36 on the shell 34. Respective plungers 33 make connection with the winding 20. The bottom part of the shell 34 is provided with a generally rectangular flange 34a adapted dimensionally to be inserted within the undercut section 28a in the groove 28. Upon turning of the shell 34 90° to either side, it becomes locked in position through interference of the flange 34a with the walls of the undercut 28a. To prevent the turning of the shell 34 while the locking nut 36 is being tightened, the sides of the shell 34 directly above the flange 34a are of rectangular shape and fit snugly into the upper section of the groove 28. The last threads on the shell 34 are squeezed to prevent removal ever of the locking nut 36 and to facilitate the fastening and the removing of the taps 23. A flexible conductor 37 is fastened or soldered externally to the protruding stem 33a of the plunger 33.

To fasten a tap 23 inside the groove 28, the operator grips the nut 36 in his fingers, turns it on the shell 34 until an interference is produced with the squeezed threads, inserts it at a predetermined point of the groove 28, presses it all the way in, turns it 90°, releases it to allow shell's recoil and tightens the nut 36. Reverse operation is performed to remove the tap from the groove 28.

While the basic idea explained with reference to Fig. 2 remains substantially the same, there are possible numerous modifications in design of the taps 23 and of the mandrel 29. Thus, the resistance housing mandrel may be provided with a plurality of straight grooves 128 seen in Fig. 2b instead of the helical groove 28 in Figs. 2 and 2a. The resistance winding 120 is extended from one groove 128 to the next successive groove through bending at mandrel's extremities. The mandrel 129a can be a cylinder or a rectangular plate. A plurality of straight resistance sectors embedded in respective grooves 128 and connected electrically in series by means of interconnectors can be employed instead of bending the winding 120 according to Fig. 2b.

Further, the shell 34 can be provided with an internal thread, the connections to the resistance winding being established by a screw contact engaging internally the shell 34, eliminating the spring loaded plunger.

The conductors 37 connect to respective taps 44 on the interpolating potentiometer 43 and can be identified easily by tape identification numerals (not shown). The connection between the tap 44 and the winding 43 can be accomplished through welding, spring-loading, threaded engagement or other suitable means.

The winding 43 can generally be circular, electrically continuous, circular, with a gap, or a multi-turn coil similar to resistance 20. The spacing between the taps 44 can be made uniform or non-uniform depending on application. A wiping contact 46 is disposed by the shaft 50 in conductive engagement with the winding 43. Its potential is transferred via a collector ring 51 to the output voltage terminal 52, which in turn is connected to an external load circuit (amplifier, voltage indicator). The shaft 50 is controlled by a suitable controlling means 47 (servo, hand-wheel, thermostat), its travel distance being indicated by a suitable indicating dial (not shown).

The description of the two variable instrument is as follows:

Referring first to Fig. 6, there is shown the general method of representing graphically a function of two variables $v=f(x, z)$ as a family of curves in a two dimensional plane $v$—$x$, "$z$" being considered as a parameter adapted to assume fractional as well as integral values. In Fig. 6 curves for integral parameters $z=0$, 1, 2, 3, ... have been drawn. The purpose of the instrument when referred to Fig. 6 can be defined broadly as finding the voltage "$v$" for any desired combination of mechanical inputs "$x$" and "$z$" in conformance with the function $v=f(x, z)$. The principle of operation can be clarified by way of an example: Assuming that it is desired to find the value of "$v$" for $x=4.57$, $z=2.35$, first the location of the perpendicular $x=4.57$ is determined in the plane $v$—$x$ by linear interpolation between $x=4.00$ and $x=5.00$. Next, the location of $z=2.35$ on the line $x=4.57$ is established by a linear interpolation between $z=2.00$ and $z=3.00$ which yields the solution "$v$."

This relatively simple method of solving a function of two variables is followed closely in operation by the two variable instrument. Referring to Fig. 7, there is seen a plurality of dividers 20 provided with respective pluralities of attachable taps 23, the latter being connected via conductors 37 to respective taps 44 on the interpolating potentiometers 43. The respective shafts 50 can be ganged and controlled simultaneously by the "$x$" control means 47. The output terminals 52 of respective potentiometers 43 are connected via respective conductors 37a to taps 44a on a single potentiometer winding 43a, the latter controlled by "$z$" controller 47a. The final output potential of the instrument is obtained at the terminal 52a of the winding 43a. The windings 43 and 43a can be electrically continuous, non-continuous, single or multi-turn.

The operation of the above organization is as follows:

The setting of taps 23 in respective voltage dividers 20 is such as to produce desired output voltage functions "$z$" at respective terminals 52 relative to displacement of the shaft 50. The wiper 46a interpolates between those potentials and produces an output potential function $v=f(x, z)$ at the terminal 52a.

It is apparent that for fractional (non-integral) curves "$z$" in Fig. 6, the spacing of taps 44a will be proportionately ununiform.

It will be understood further that each respective pair of interconnected resistances 20 or 43 could be substituted by a functional potentiometer of any conventional or commercially available type (tapered card) all the other electrical connections remaining substantially similar to those seen in Fig. 7.

The two variable instrument described in Fig. 7 will have a relatively low input impedance, since it comprises a plurality of resistance networks connected in parallel. Its impedance can be increased considerably by incorporating an arrangement seen in Fig. 7a, the latter comprising a rotary selector 121 controlled by the shaft 50a, provided with a switching arm 122 to control the voltage input to the dividers 20 in relation to position of the wiper 46a. The purpose of the selector 121 is to supply a voltage to only those two taps 44a between which the wiper 46a is located at that time. The arm 122 is connected via a single conductor 124 to the voltage supply line 21. The contact points 126 of the selector 121 are arranged in two arrays, their location and length corresponding to the spacing between respective taps 44a on the winding 43a. The points 126 feed respective voltage divider resistances 20 via conductors 26, the circuit being completed via conductors 27 back to the supply line 22. It has been pointed above that respective dividers 20 are adjusted to produce functions $z=0$, 1, 2, . . . etc. at the terminals 52 relative to rotation of the shaft 50. In the arrangement in Fig. 7a, the dividers set to represent functions $z=0$, $z=2$, $z=4$ etc. are connected sequentially to respective contact points 126 in one of the arrays, while the dividers set to represent odd functions "$z$" are connected to respective points 126 in the other array. The arm 122 is disposed generally in electrical engagement with one contact 126 in each array, but may engage two contacts 126 in an array during commutation periods. Thus, when the arm 46a is in direct contact with a tap 44a both adjacent taps receive electrical inputs from their associated resistance networks.

Referring to Fig. 3, there is shown a potentiometer employing a rotary selector 56 and an intermittent-locking coupling 80. The taps 23 of the divider 20 are connected via conductors 37 to respective contacts 54 of the selector 56. The contacts 54 are arranged in a pair of concentric arrays 61 and 62, the contacts in each array being of the same size and spaced at an even distance from each other. A pair of wipers 57 and 58 insulated from each other and connected to a common displacing arm 90 are adapted to cooperate conductively with contacts 54 in respective arrays 61 and 62 and with a pair of collector rings 91 and 92. The arm 90 is coupled operatively to a rotor 63 and adapted for intermittent step displacement by the intermittent, locking coupling 80. The latter consists of a pair of meshing gears 67 and 68 coupled to respective shafts 50 and 72, of a pair of intermittently engageable gears 71 and 69 coupled to respective rotors 63 and 72 and of a locking gear 70 on the rotor 63. The transmission ratio between the gears 67 and 68 is two to one, the gear 69 is provided with only one single shaped tooth. The number of teeth in each of the gears 70 and 71 is equal to the total number of the contacts 54. The shape of teeth in the gears 70 and 71 is generally triangular, but can be of other form as well. The gears 70 and 71 are set off by half of the angle between their teeth with respect to each other. When the tooth gear 69 is separated from the gear 71, a sector of the shaft 72 enters in between the teeth of the gear 70 producing a locking effect on the rotor 63. A slot 72a is generally provided in the shaft 72 to release the gear 70 for step motion upon the tooth gear 69 engaging the gear 71.

Assuming counterclockwise rotation of the shaft 72 and referring to Fig. 3c, the arm 69 will impinge on a tooth 71a of the gear 71 located at that time in the plane of an axis drawn between centers of shafts 63 and 72 and will tend to force the gear 71 to move also in counterclockwise direction of rotation. Simultaneously with the above operation, the slot 72a situated at that time directly opposite the teeth 70b and 70c of the gear 70 will provide a recess into which the tooth 70b may enter as the arm 69 forces the gear 71 in C. C. W. direction, releasing thus the gear 70 for rotation of one step. As the rotation of the shaft 72 is continued C. C. W. and the gears 70 and 71 move, the arm 69 will eventually disengage from the tooth 71a and the circular section of the shaft 72 enter between the teeth 70a and 70b locking the gear 71 in position. It is evident that an entirely similar operation will take place in clockwise direction of rotation if the rotation of the shaft 72 is clockwise. The wipers 57 and 58 are connected via collector rings 91 and 92, conductors 76 and 77 to respective taps 44a and 44b, the latter being arranged 180° apart on an electrically continuous, circular coil 43. An output wiper 46 is linked operatively to the shaft 50 and disposed in conductive engagement with the coil 43 by a control means 47.

The operation of the system described with reference to Fig. 3 is as follows:

The potentials applied to the contacts 54 in the arrays 61 and 62 identify the "$v$" values of the points 0, 2, 4, 6, ... etc., and the points 1, 3, 5, 7, ... etc., located sequentially on the curve of the function $v=f(x)$. The points 0, 1, 2, 3, 4, ... etc., are spaced at a uniform distance from each other with reference to the axis "$x$" as shown in Fig. 4. At the zero displacement position of the shaft 50, the wiper 46 will be situated opposite the tap 44a, the wiper 57 at the right hand extremity of the contact 54-0, and the wiper 58 at the left hand extremity of the contact 54-1. The direction of rotation of respective wipers 46, 57, and 58 is assumed in this example to be clockwise. As the wiper 46 is being displaced towards the tap 44b, its changing voltage represents interpolated potential values between the potentials of respective contacts 54-0 and 54-1. Relative to the wiper 46 by-passing the tap 44b, the single tooth gear 69 engages the gear 71 and moves the wiper 57 towards the left hand extremity of the contact 54-2 and the wiper 58 towards the right hand extremity of the contact 54-1. As the wiper 46 is being displaced towards the tap 44a, its potential varies gradually between the potentials of the contacts 54-1 and 54-2.

The operation of the coupling 80 is repeated in either direction of rotation whenever the wiper 46 by-passes the taps 44a or 44b. Thus, a continuous voltage function is produced at the output terminal 52 relative to the rotation of the shaft 50. In this organization the taps 23 can be set in accordance with readings of linear scale 32 imprinted along the length of the groove 28, without resort to calculation and measuring instruments.

Referring to Fig. 3b, there is seen the intermittent-locking coupling described in detail with reference to Fig. 3, modified for use as a vernier indicating dial. Same numerals provided with identification subscripts "$b$" are used in Fig. 3b to identify members similar to those employed in Fig. 3.

The coupling 80b is contained between a pair of plates 117 and 118 serving as a bearing support for the shafts 72b, 50b and for the gear 67b. An instrument shaft 50b whose travel it is desired to determine is coupled operatively to the gear 67b by means of a key 116. A pair of Lucite pointers 114 and 115 are fastened to the rotor 63b and to the shaft 50b respectively. The front side of the plate 117 is provided with two concentric graduated scales (not shown), the pointer 114 cooperating with the inside scale and the pointer 115 with the external scale. The ratio between the gears 67b and 68b is one to one. It is apparent that as the shaft 50b is rotated, completed rotations will be registered by the pointer 114 and fractions of rotations by the pointer 115 on their respective scales. The dial described in Fig. 3b could be employed in the organizations in Figs. 1 and 3 to indicate the rotations of the shaft 50.

Several modifications of the arrangement in Fig. 3 are considered by the inventor and include:

A. Use of a double array of contacts 54 seen in Fig. 3a, provided with three wipers 57, 57a and 58, the latter connected to respective taps 44a, 44c and 44b on the interpolating potentiometer 43. The winding 43 is provided with a gap 59. The taps 44a and 44c are situated close to each other on either side of the gap, and the tap 44b is 180° between the taps 44a and 44c. In all the other details, this system is similar to the organization in Fig. 3.

Its operation is as follows:

When the wiper 57 in the array 61 engages for instance a contact 54-0, the wiper 57a engages the insulation layer between the contacts 54-0 and 54-2 in the same array and remains therefore insulated from them. And reverse, when the wiper 57a engages a contact 54-2, the contact 57 remains insulated from the source 20. The wiper 58 remains generally in conductive engagement with the one or with the other extremity of respective contacts 54 in the array 62 (except for commuting periods between contacts 54), its motion being same as the motion of the contact 58 in Fig. 3.

The coupling between the shaft 50 and the rotor 63 carrying the wipers 57, 57a and 58 is such, that when the contact wiper 46 moves between the taps 44a and 44b, the wiper 57a is insulated from the contacts 54 and no potential is applied therefore to the tap 44c. Similarly, when the wiper 46 moves between the taps 44b and 44c the selector wiper 57 is insulated then from the contacts 54 and no potential is being applied at that time to the tap 44a. Thus, current is being drawn at any time by only one half of the winding 43, which results in lesser loading of the divider 20 by the interpolator 43. The width of the wiper 46 can be made larger than the width of the gap 59 to insure continuity in the output voltage.

B. Use of a triple array of contacts 54, each array being provided with a single wiper connected to a respective tap 44, the latter being spaced 120° apart on an electrically continuous, circular interpolator winding 43. The intermittent-locking coupling 80 is substituted in this organization by a continuous gear transmission designed to produce a reduction ratio between the rotation of the shaft 50 and the rotation of selector's wipers equal to the total number of contacts in the selector 56 divided by three. When the interpolator wiper 46 moves between any two taps 44, the selector wipers connected directly to those taps move along a pair of respective selector contacts without breaking electrical engagement with the latter. At the same time the selector wiper connected to the third tap commutates from one selector contact to the next consecutive contact. The continuity in the output voltage is insured by dimensioning of rotary selector components and by correct spacing of its wipers. No additional information is presented, as the operation of this system is self-explanatory by reference to above description and to Figs. 3 and 3a.

In laboratory work, the speed of presetting of functional relationships, not the physical size of the unit is often the main consideration. For such applications, the voltage divider 20 seen in Figs. 1 and 3 can be substituted by an arrangement shown in Fig. 5. A rotary selector 104 and a plurality of adjustable rheostats 101 are employed. Each of the rheostats 101 is provided with an adjustable wiper 102 and with at least one input terminal 103. Each of the wipers 102 is connected via a conductor 105 to the terminal 103 of the next consecutive rheostat 101. The terminals 103 are connected via conductors 113 to respective contact points 112 of the selector 104 and via conductors 37 either to respective taps 44 in Figs. 1 and 7 or to selector contacts 54 in Figs. 3 and 3a. The selector 104 is provided with a pair of wiping arms 106 and 107 connected via respective conductors 109 and 110 to a resistance measuring bridge 108. The position of those arms with respect to contact points 112 can be identified by a dial (not shown).

To adjust a potentiometer incorporating the above voltage divider arrangement for a given function, the operator calculates the required amounts of resistance between consecutive taps 44 or selector contacts 54 and adjusts manually respective rheostats 101 with the assistance of the selector 104 and the bridge 108 to provide the requirements. When the arrangement described with reference to Fig. 5 is incorporated in the organization in Fig. 3, the selector 56 may be employed to supply potentials to the bridge 108, eliminating thus the use of selector 104.

While the invention has been described with reference to certain embodiments, it should be borne in mind that it is applicable not merely to resistance elements, but to all types of variable voltage sources comprising voltage division means provided with taps from which voltages of different magnitude, phase, frequency, etc., may be obtained and applied selectively to voltage interpolating means.

What I claim as novel and desire to secure by Letters Patent is:

1. A bolt operatively connectible to a support and slidable along the length thereof, having one end flanged, another end threaded, straight sided section between said flanged and said threaded ends, a groove in said support, a recess in said groove, said flanged end being adapted for locking in said recess, said straight sided section abutting against the unrecessed surfaces of said groove and preventing the free turning of said bolt in said groove and a nut for threaded end of said bolt to lock it firmly in position.

2. A contactor operatively connectible to an electrical conductor element, having one end flanged, another end threaded, straight sided section between said flanged and said threaded ends, a support, a groove in said support, said conductor element being held within said groove, the flange of said contactor being adapted for locking in said recess, the unrecessed surfaces of said groove abutting against said straight sided section in said contactor and preventing the free turning thereof, a nut for the threaded end of said contactor to lock it firmly in position and a spring loaded plunger cooperating slidingly with said contactor, in conductive engagement with said conductor element.

3. The combination according to claim 2, wherein said flange is of oblong cross-section and may be locked in said recess by a 90° turn at any desired point of said groove.

4. In a functionally adjustable voltage divider, in combination, a resistance winding provided with a plurality of taps and with first wiping means, control means to dispose said first wiping means along the length of said resistance winding, a rotary selector provided with a plurality of contact points and with second wiping means comprising a plurality of individual wipers connected to respective ones of said taps, adjustable resistance means connected between consecutive ones of said contact points and gear means controlled by said control means, adapted to dispose said second wiping means along the length of said contact points in predetermined relationship to the displacement of said first wiping means.

5. The combination according to claim 4, wherein said plurality of contact points is arranged in three symmetric arrays, wherein said resistance winding is circular and electrically continuous, said taps on it being spaced 120° apart from each other, said gear means being designed to produce a reduction ratio between respective displacements of said first wiping means and said second wiping means, said reduction ratio being equal to number of contact points in one of said three arrays.

6. The combination according to claim 5, wherein said plurality of contact points is arranged in a pair of symmetric arrays, said resistance winding being electrically non-continuous and provided with an insulation gap between the extremities thereof, said taps being situated at each of said extremities and half way between said extremities, said gear means comprising an intermittent motion coupling adapted to produce step motion of said second wiping means upon each 180° rotation of said first wiping means.

7. A voltage generator adapted to produce voltage outputs as a desired function of movement of a pair of independently operated cranking members comprising in combination, a plurality of first resistance windings, first wiping means comprising a plurality of individual wipers controlled by the first one of said cranking members, said wipers being adapted to be disposed along the length and in conductive engagement with respective ones of said first windings, a second resistance winding, a plurality of taps on said second winding, second wiping means controlled by the second one of said cranking members adapted to be disposed along the length and in conductive engagement with said second winding, conductor means interconnecting said wipers with respective ones of said taps, source of voltage and rotary selector provided with a plurality of contact points connected to respective extremities of said first resistance windings and with a wiping arm connected to said voltage source and displaceable along the length of said contact points by said second cranking member.

8. In an adjustable voltage divider, in combination, a resistance element provided with a plurality of taps and with first wiping means, control means to dispose said first wiping means along the length of said resistance element, a rotary selector provided with a plurality of contact points and with second wiping means comprising a plurality of individual wipers connected to respective ones of said taps, resistance means connected between consecutive ones of said contact points, an intermittent motion coupling comprising a rotor free to turn about its axis controlling the position of said second wiping means, a pair of gears mounted fixedly on said rotor, a member controlled by said control means having circular section entering in between a pair of respective teeth in the first one of said gears to lock said rotor in position, said member being free to turn about its axis and having an arm to engage upon the rotation thereof respective teeth of the second one of said gears forcing said rotor to turn intermittently and a slot in said member's circular section to provide recess to turn respective teeth of said first gear when said arm engages respective teeth of said second gear.

9. In an adjustable voltage divider, in combination, a resistance element provided with a plurality of taps and with first wiping means, control means to dispose said first wiping means along the length of said resistance element, a rotary selector provided with a plurality of contact points and with second wiping means comprising a plurality of individual wipers connected to respective ones of said taps, resistance means connected between consecutive ones of said contact points and a Geneva movement adapted to dispose said second wiping means along the length of said contact points by intermittent step movements in predetermined relationship to the displacement of said first wiping means.

10. In a voltage dividing device controlled by two independently variable conditions, means to produce voltage as a desired function of said two conditions, including three or more voltage division elements, wiping means operated by the first one of said conditions to move along the length and in conductive engagement with respective ones of said division elements, an electrically resistive element, wiping contact device operated by the second one of said conditions to move along the length and in conductive engagement with said resistive element, electrical connections to connect respective ones of said wiping means to points spaced along said resistive element, a voltage source, and means to sequentially connect and disconnect said voltage source and respective ones of said division elements relative to movement of said wiping contact device.

11. The combination according to claim 10, wherein said division elements may divide voltage linearly or non-linearly relative to their respective lengths.

References Cited in the file of this patent

UNITED STATES PATENTS

| 1,618,140 | Seward | Feb. 15, 1927 |
| 1,995,206 | Geissbuhler | Mar. 19, 1935 |
| 2,108,146 | Simpson | Feb. 15, 1938 |
| 2,351,814 | Holzner | June 20, 1944 |
| 2,446,191 | Pemberton | Aug. 3, 1948 |
| 2,447,395 | Sunstein | July 26, 1949 |
| 2,533,656 | Wills | Dec. 12, 1950 |